(12) United States Patent
Foerster et al.

(10) Patent No.: US 9,707,951 B2
(45) Date of Patent: Jul. 18, 2017

(54) RAIL VEHICLE BRAKING DEVICE AND METHOD FOR BRAKING A RAIL VEHICLE

(71) Applicant: SIEMENS AKTIENGESELLSCHAFT, Munich (DE)

(72) Inventors: Till Foerster, Fuerth (DE); Stefan Hassler, Kirchenthumbach (DE); Reiner Heilmann, Egmating (DE); Jean-Pascal Schwinn, Munich (DE); Thorsten Stuetzle, Nuremberg (DE); Manfred Wiesand, Burgthann (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/382,061

(22) PCT Filed: Feb. 28, 2013

(86) PCT No.: PCT/EP2013/054057
§ 371 (c)(1),
(2) Date: Aug. 29, 2014

(87) PCT Pub. No.: WO2013/127934
PCT Pub. Date: Sep. 6, 2013

(65) Prior Publication Data
US 2015/0032302 A1    Jan. 29, 2015

(30) Foreign Application Priority Data
Feb. 29, 2012   (DE) .......... 10 2012 203 132

(51) Int. Cl.
*B60T 8/17*   (2006.01)
*B60T 17/22*   (2006.01)
(Continued)

(52) U.S. Cl.
CPC .............. *B60T 17/228* (2013.01); *B60L 7/00* (2013.01); *B60T 8/1705* (2013.01); *B61H 9/06* (2013.01);
(Continued)

(58) Field of Classification Search
CPC ........ B60T 17/228; B60T 8/1705; B60L 7/00; B61H 11/00; B61H 13/34; B61H 9/06
See application file for complete search history.

(56) References Cited

U.S. PATENT DOCUMENTS 5,853,230 A    12/1998  Wagner et al.
5,924,774 A *   7/1999  Cook et al. .................... 303/3
(Continued)

FOREIGN PATENT DOCUMENTS

CA    2724443 A1   10/2009
CN    101380900 A    3/2009
(Continued)

OTHER PUBLICATIONS

Lionginas Liudvinavičius & Leonas Povilas Lingaitis (2007) Electrodynamic braking in high-speed rail transport, Transport, 22:3, 178-186 (hereinafter Lingaitis).*
(Continued)

*Primary Examiner* — Adam Mott
(74) *Attorney, Agent, or Firm* — Laurence Greenberg; Werner Stemer; Ralph Locher

(57) ABSTRACT

A rail vehicle braking device has at least one electrodynamic brake, which comprises a drive unit, which has at least one drive motor and a power supply unit for supplying the drive motor when the drive unit is in a traction mode. The rail vehicle braking device has at least two brake control units in order to increase the safety of the electrodynamic brake. In a first braking mode, a first brake control unit in an active state controls the power supply unit for providing a braking (Continued)

effect, a first brake effect monitoring unit and a switching unit, which serves to switch, depending on a brake effect parameter in the first braking mode, into a second braking mode, in which the second brake control unit in an active state controls the power supply unit for providing a brake effect.

12 Claims, 2 Drawing Sheets

(51) Int. Cl.
    *B60L 7/00* (2006.01)
    *B61H 11/00* (2006.01)
    *B61H 13/34* (2006.01)
    *B61H 9/06* (2006.01)

(52) U.S. Cl.
    CPC ............ *B61H 11/00* (2013.01); *B61H 13/34* (2013.01); *B60L 2200/26* (2013.01)

(56) References Cited

U.S. PATENT DOCUMENTS

| | | |
|---|---|---|
| 6,456,909 B1 | 9/2002 | Shimada et al. |
| 6,669,308 B1* | 12/2003 | Aurich et al. ............... 303/15 |
| 7,986,115 B2 | 7/2011 | Jobard |
| 8,836,161 B2 | 9/2014 | Nogi et al. |
| 2002/0074854 A1 | 6/2002 | Fukasawa |
| 2004/0054450 A1 | 3/2004 | Nakamura et al. |
| 2009/0125170 A1 | 5/2009 | Noffsinger et al. |
| 2010/0256843 A1* | 10/2010 | Bergstein et al. ............ 701/19 |
| 2011/0093142 A1 | 4/2011 | Burg et al. |
| 2012/0000739 A1 | 1/2012 | Nogi et al. |
| 2012/0031692 A1 | 2/2012 | Koike |
| 2012/0192757 A1 | 8/2012 | Schiffers et al. |

FOREIGN PATENT DOCUMENTS

| | | |
|---|---|---|
| DE | 19615805 A1 | 10/1997 |
| DE | 10160619 A1 | 7/2002 |
| DE | 102006043892 A1 | 3/2008 |
| DE | 102008018873 A1 | 10/2009 |
| DE | 102008027520 A1 | 1/2010 |
| DE | 102010005938 A1 | 7/2011 |
| EP | 1195286 A2 | 4/2002 |
| EP | 1266814 A2 | 12/2002 |
| EP | 2033835 A2 | 3/2009 |
| EP | 2060459 A1 | 5/2009 |
| EP | 2415626 A1 | 2/2012 |
| RU | 2192974 C2 | 11/2002 |
| RU | 116413 U1 | 5/2012 |
| SU | 709416 A1 | 1/1980 |
| WO | 9719844 A1 | 6/1997 |
| WO | 2008052696 A1 | 5/2008 |
| WO | 2011036003 A2 | 3/2011 |

OTHER PUBLICATIONS

Siemens AG, "Funktionale Sicherheit in der Prozessinstrumentierung mit Einstufung SIL", 2007, Process Automation—English translation.

Lee, J-H, et al, "Design of on-board computer system for Korean High-Speed Train", High-Speed Railways T.F.T., Korea Electrotechnology Research Institut (KERI), Korea, WIT Press 2000, ISBN:1-85312-826-0, pp. 1-9.

* cited by examiner ations in the control of the drop unit in
RAIL VEHICLE BRAKING DEVICE AND METHOD FOR BRAKING A RAIL VEHICLE

BACKGROUND OF THE INVENTION

Field of the Invention

The invention relates to a rail vehicle braking device comprising at least one electrodynamic brake, which comprises a drive unit, which has at least one drive motor and a power supply unit for supplying power to the drive motor in a traction mode of the drive unit.

Rail vehicles in which a braking force is generated by electric motors are known. The kinetic energy of the vehicle converted regeneratively into electrical energy during the braking by the motors is converted into heat, for example via a braking resistor, or fed back to the rail road supply grid or else to a mobile storage unit.

In addition to the electrodynamic, regenerative brake, the rail vehicles generally furthermore have a full-service friction brake, in which the braking effect is achieved pneumatically, hydraulically and/or mechanically.

In braking systems, it is conventional to distinguish between the types of braking "service braking" and "emergency braking" (also referred to as "quick-response braking" or "hazard braking"). While service braking is used for reducing the velocity of the train, even until it is at a standstill, there are more restrictive demands placed on emergency braking beyond this which ensure the greatest possible safety for passengers, staff and others. Generally, the electrodynamic brake is preferably used for service braking.

In the case of emergency braking, the regenerative brake is generally not used without simultaneous actuation of the friction brake. The reason for this consists in the until now lower level of failsafety of the electrodynmic brake in comparison with the electropneumatic or electrohydraulic friction brake, with the result that, until now, the greatest possible braking safety can only be achieved using the friction brakes.

However, in the extreme case, which is generally the case for subway trains, this means that a motor car of a train with the friction brake and the electrodynamic brake has in principle two full-service braking units, wherein each can itself generate, within a wide travel velocity range, a braking torque which is sufficient for maintaining the specified braking distances so that, in this respect, one braking unit could be used in place of the other.

The two braking units have different advantages. While the friction brake ensures greater safety in the case of emergency braking, the regenerative brake has economic advantages. Thus, for example, there is no wear in brake linings and brake disks. In addition, partial utilization of the transformed kinetic energy is possible.

BRIEF SUMMARY OF THE INVENTION

The invention is based on the object of increasing the safety of the electrodynamic brake.

In this regard, it is proposed that the rail vehicle braking device has at least two braking control units, wherein, in a first braking mode, a first braking control unit, in an active state, controls the power supply unit so as to provide a braking effect, a first braking effect monitoring unit and a switching unit, which is used, in the first braking mode, to switch over to a second braking mode depending on a braking effect characteristic quantity, in which second braking mode the second braking control unit, in an active state, controls the power supply unit so as to provide a braking effect. As a result, a rail vehicle braking device can be provided which has a high degree of safety in respect of faulty operation of the electrodynamic brake by virtue of an advantageous redundancy in the control of the drive unit in a braking mode thereof being provided. With the proposed rail vehicle braking device, the safety of the electrodynamic brake can achieve that of a conventional friction brake.

The power supply unit preferably has controllable electronic elements which, in the traction mode, are controlled in accordance with a control strategy, in respect of a specific drive torque to be achieved, so as to supply a corresponding electric power to the drive motor. The controllable elements are in particular in the form of switching elements or valve elements which, by means of switching operations corresponding to a switching strategy, generate a power flow with a matched voltage, frequency and/or current, with which the drive motor is driven. In particular, the power supply unit can be in the form of an inverter which, in the traction mode, draws the required energy from an intermediate circuit, for example a DC link.

In a braking mode of the electrodynamic brake, the power supply unit or the controllable elements thereof are expediently controlled by means of the assigned braking control unit in such a way that, by means of the drive motor which is operatively connected to the power supply unit, a braking torque which can be transmitted onto an axle of the rail vehicle is generated.

A "braking effect characteristic quantity" should in particular be understood to mean a characteristic quantity which can be used to obtain at least one item of information relating to a braking effect of the electrodynamic brake. This braking effect can be a braking effect achieved by means of the electrodynamic brake or a braking effect which can be achieved by operation of a braking control unit. In the former alternative, the braking effect monitoring unit can comprise a sensor unit, by means of which at least one operational characteristic quantity related to the rail vehicle, such as, for example, an instantaneous velocity characteristic quantity, an instantaneous acceleration characteristic quantity, a braking force characteristic quantity, etc., can be detected. In the latter alternative, the braking effect monitoring unit can evaluate control signals generated by an active braking control unit for controlling the power supply unit in order to determine a braking effect which can be achieved by the control signals. A "braking effect" can in particular be understood to mean a braking force or a braking torque which can be transmitted onto a rail vehicle wheelset.

A further gain in safety can be achieved if a sensor unit, which is provided for detecting the braking effect characteristic quantity and is used by a plurality of independent systems, is used in a manner free of feedback. This can be achieved, for example, by virtue of the fact that lines between the sensor unit and the different systems are galvanically isolated in order to keep the systems independent from one another.

In the second braking mode, the first braking control unit can continue to be operated by virtue of the second braking control unit being connected by means of the switching unit. In this case, a lack of braking effect can be compensated for by means of the second braking control unit. In a preferred embodiment of the invention, however, it is proposed that the first braking control unit is in an inactive state in the second braking mode. As a result, undesired effects of faulty operation of the first braking control unit can be largely avoided. The switching unit in this case expediently effects switchover between the two braking control units. An increased level of safety during operation of the electrodynamic brake can also be achieved if the first braking effect monitoring unit is used for monitoring the first braking control unit, and if at least one second braking effect monitoring unit is provided for monitoring at least the second braking control unit.

In this context, it is proposed that the rail vehicle braking device has a further braking apparatus and a switching device, wherein, in the second braking mode, this further braking apparatus is actuated by means of the switching device depending on a braking effect characteristic quantity. As a result, in the case of a faulty operation of the second braking control unit, an additional braking effect can be provided by means of the further braking apparatus.

In an embodiment which is simple in design terms, it is proposed that this braking apparatus is in the form of a parking brake.

In addition, it is possible to provide alternative brakes as an embodiment of the further braking apparatus which in particular have greater performance than a parking brake. Thus, for example, brakes can be used for providing a sufficient braking effect which deviate from the regenerative principle of an electrodynamic brake and demonstrate their braking effect by virtue of a pressure increase in pneumatic or hydraulic brake cylinders. In addition, an electromagnetic track brake, which is operated by pneumatic, hydraulic and/or mechanical actuation of an actuator in conjunction with a magnetic field generated by a current, can be used as further braking apparatus. Furthermore, a braking system based on the principle of eddy currents is possible. Connection of or an increase in braking effects by means of at least one further braking apparatus can take place until all available brakes are completely connected.

In a further embodiment of the invention, it is proposed that the braking control units differ from one another with respect to their structural and/or algorithmic design. By virtue of the use of different technologies for the braking control units, a particularly high level of safety can be achieved since a system with a diverse redundancy can be provided. Particularly advantageously, the spread of a possible systematic fault which is specific to a certain technology from a first braking control unit to a second braking control unit or a chain of further braking control units can be avoided. The term "structural" preferably relates to hardware used for the braking control unit and the term "algorithmic" preferably relates to an implementation of at least one control function of a braking control unit by means of software. The differences in the structural embodiment and/or in the algorithmic embodiment preferably relate to functions of the braking control units which are relevant to the activation of the power supply unit or of controllable elements thereof. In this proposed embodiment, the braking control units, in an embodiment of the power supply unit with switching or valve elements, can control the switching or valve elements in accordance with two different switching strategies. In this case, the switching strategy of the first braking control unit is different than the switching strategy of the second braking control unit.

With respect to the algorithmic embodiment, in this context it is proposed that software for executing at least one control function is implemented differently in the second braking control unit than in the first braking control unit. A "different implementation" can in particular be understood to mean that the software of the first braking control unit differs from the software of the second braking control unit in respect of the algorithm and/or the programming code. In this case, it is advantageous if the software of the first and second braking control units is set up by means of different design tools. Furthermore, it is advantageous if the software of the braking control units is developed by different people.

With respect to the structural embodiment, it is additionally proposed that one of the braking control units is in the form of purely hardware-based control. In this case it should in particular be understood that the hardware control relevant for the activation of the power supply unit takes place without the use of software.

In order to increase the reliability of the electrodynamic brake, in a further embodiment of the invention it is proposed that the rail vehicle braking device has a test mode, in which the switching unit is tested.

In addition, it is proposed that the rail vehicle braking device has an interface to a vehicle emergency brake line, by means of which emergency braking by means of the electrodynamic brake can be initiated. With the safety level which can be achieved by the proposed design of the rail vehicle braking device, in particular by the high level of redundancy of the control units of the electrodynamic brake, a rail vehicle with an emergency braking apparatus can be provided, wherein emergency braking can take place exclusively by means of the electrodynamic brake with a sufficient safety level. As a result, a full-service, additional friction brake can advantageously be dispensed with. For lower velocities, only a parking brake, for example in the form of a spring-loaded brake, can be retained as friction brake, which prevents the parked vehicle from rolling away on a slope by means of a spring energy store. Thus, a marked reduction in the unit costs of braking components and the weight of the rail vehicle can be achieved. In an advantageous development of the invention, it is proposed that the rail vehicle braking device comprises at least one second electrodynamic brake, which comprises a drive unit, which has a least one drive motor and a power supply unit for supplying power to the drive motor in a traction mode of the drive unit, and at least one braking regulation unit, which has the respective power supply unit and at least one braking control unit, which, in a first braking mode, controls the respective power supply unit so as to provide a braking effect, wherein the braking control units are at least component parts of a braking monitoring apparatus assigned to the second brake. As a result, a braking monitoring device can be provided for the second brake which is independent of the braking regulation unit of the second brake. In this case, evaluation and decision-making processes implemented in the braking monitoring device are implemented by the braking control units of the other brake, with the result that these processes are independent of processes of the braking regulation unit of the second brake. Owing to the independence of the braking monitoring device of the second brake from the braking regulation unit thereof, advantageous isolation of the control functions and the monitoring functions of the second brake can be achieved, wherein a high level of safety with respect to spreading of systematic faults from a control or regulation unit onto a monitoring unit can be achieved. The braking monitoring device for the second brake furthermore comprises at least two monitoring devices in the form of braking control units, with the result that an advantageously diverse redundancy of the braking monitoring device can be achieved.

Furthermore, it is proposed that at least the braking regulation unit of the second brake forms a braking monitoring apparatus assigned to the first brake. As a result, advantageous mutual, in particular crossed-over monitoring of the electrodynamic brakes can be achieved.

BRIEF DESCRIPTION OF THE SEVERAL VIEWS OF THE DRAWING

An exemplary embodiment of the invention will be explained with reference to the drawings, in which.

DESCRIPTION OF THE INVENTION

Figure 1:
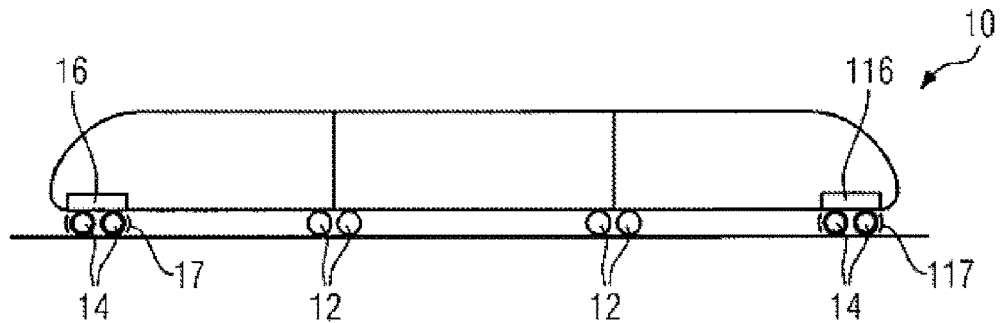
FIG. 1 shows a rail vehicle comprising drive axles and drive units assigned thereto.

FIG. 1 shows a rail vehicle 10 in the form of a traction vehicle in a very schematized side view. It has idler axles 12 and drive axles 14, which are driven in a traction mode by means of drive units 16, 116. A braking operation of the rail vehicle 10 takes place by means of the drive units 16, 116, which in this case each have the function of an electrodynamic brake. For braking operations at low velocities, in each case a further braking apparatus 17, 117 is provided, which is in the form of a parking brake (illustrated schematically in the figure) embodied as a spring-loaded brake.

The control of the drive unit 16 as part of an electrodynamic brake will be explained in more detail with reference to FIG. 2. The drive unit 16 has at least one drive motor 18, which can be in the form of an AC machine. In order to supply electrical power to the drive motor 18, the drive unit 16 furthermore comprises a power supply unit 20, which is operatively connected to the drive motor 18. In an embodiment which is not shown, the drive unit 16 can have a plurality of drive motors, which are supplied power by the same power supply unit 20. The power supply unit 20 is known from the prior art and has an inverter (not illustrated in any more detail), which, in a traction mode of the drive unit 16, generates a current which is variable in voltage and frequency according to the power to be provided for the drive motor 18 starting from a DC link, by virtue of the actuation of electronic switching elements, also referred to as "valves". The energy available in the DC link is drawn from a high-voltage grid supply 26, which is operatively connected to a railroad grid supply via further electrical conversion devices (not illustrated), such as in particular a transformer or a voltage converter, a rectifier, etc. In the traction mode of the drive unit 16, the switching elements of the inverter are controlled in accordance with a switching strategy in order to generate, via the drive motor 18, a drive torque onto the assigned drive axles 14.

The drive motor 18 forms, together with a braking regulation unit 22, an electrodynamic brake 24. The braking regulation unit 22 comprises, in addition to the power supply unit 20, two braking control units 28 and 30, which are each provided to control, in an active state, the power supply unit 20 for a braking operation of the electrodynamic brake 24. The braking control units 28, 30 are each provided for controlling, in a braking mode of the drive unit 16, the switching elements of the inverter of the power supply unit in accordance with a switching strategy in such a way that a braking torque is exerted on the assigned drive axle 14 via the drive motor 18. During a braking operation by means of the electrodynamic brake 24, the drive motor 18 acts as a generator, wherein the energy converted into electrical current in the braking operation is converted into heat by means of a braking resistor 31. As an alternative or in addition, the energy can be fed back to the high-voltage grid supply 26, used on the vehicle or stored in a mobile storage unit.

The first braking control unit 28 is operatively connected to the power supply unit 20 via a switching unit 32, whose function will be explained further below. In addition to an interface for the power supply unit 20, the braking control unit 28 has further interfaces, by means of which it is operatively connected to a sensor unit 34. The sensor unit 34 is used for detecting a velocity characteristic quantity v and a mass characteristic quantity m, which represent input signals for the generation of control signals by the braking control unit 28. The braking control unit 28 is furthermore operatively connected to the rail vehicle management system via further interfaces by virtue of it being connected to a databus 36 of the rail vehicle 10, and to the rail vehicle main overhead line 38. Via these further interfaces, further input parameters for the braking control unit 28 can be provided, such as in particular a characteristic quantity which, in the case of service braking, represents a braking effect which is set by the vehicle driver or by an automatic vehicle control system. The braking control unit 28 is supplied electrical energy via a vehicle electric power supply 40 and is additionally operatively connected to a vehicle emergency brake line 42 via an interface 41, via which vehicle emergency brake line emergency braking of the rail vehicle 10 can be initiated.

On the basis of the abovementioned input parameters, the braking control unit 28, in a first braking mode, in which it is in an active state, generates control signals 44, which are controlled by the power supply unit 20 corresponding to a specific braking effect to be achieved, in particular corresponding to a specific braking torque to be achieved. For this purpose, the braking control unit 28 has at least one arithmetic logic unit 46 and a memory unit 48, in which software is stored. In particular the braking mode switching strategy for the switching elements of the inverter is programmed in this software.

A first braking effect monitoring unit 50 of a first braking monitoring apparatus 53 is assigned to the braking control unit 28 and is provided to monitor the braking effect which is achieved or can be achieved by the electrodynamic brake 24. For this purpose, a braking effect characteristic quantity, in particular a braking torque characteristic quantity, is used and compared with a setpoint value. The braking effect characteristic quantity can be detected, for example, by means of an acceleration sensor and/or determined by means of an evaluation of the velocity characteristic variable v. As an alternative or in addition, the braking effect characteristic quantity can be determined by means of monitoring the control signals 44 generated by the braking control unit 28. Exemplary detection of the braking effect characteristic quantity, which is denoted by the reference sign B1, is illustrated schematically in FIG. 3 by a sensor unit 58 or 158.

The braking regulation unit 22 comprises, as already mentioned above, a second braking control unit 30. This is provided for implementing at least the control function described above for the first braking control unit 28 for controlling the power supply unit 20 in a second braking mode of the drive unit 16. It is used in particular for taking on the control of the power supply unit 20 in the event of faulty operation of the first braking control unit 28.

If it is identified by means of the first braking effect monitoring unit 50 that the braking effect which is generated or can be achieved by the electrodynamic brake 24 is insufficient, the braking control unit 28 is considered as faulty and, as a fallback measure, there is a switchover by means of the switching unit 32 to a second braking mode of the electrodynamic brake 24, in which the second braking control unit 30, in its active state, controls the power supply unit 20 so as to provide a braking effect. In this second braking mode, the first, faulty braking control unit 28 is switched into an inactive state. In order to prevent driving during operation of the second braking control unit 30 in the second braking mode, it is advantageous if, with the switchover by the switching unit 32, isolation from the high-voltage grid supply 26 also takes place. This takes place by means of a grid disconnector switch 51.

A second braking effect monitoring unit 52 of the braking monitoring apparatus 53 is assigned to the second braking control unit 30. The braking effect monitoring units 50, 52 can be formed by units which are physically separate from one another or they can be formed at least partially by a common structure. In particular, the braking effect monitoring units 50, 52 can be formed completely by the same structure. The second braking effect monitoring unit 52 is provided for monitoring the braking effect which is or can be achieved by means of the electrodynamic brake 24 in the second braking mode thereof with the second braking control unit 30. For this purpose, as already described above, a braking effect characteristic quantity, in particular a braking torque characteristic quantity, is detected or determined and compared with a setpoint value. This braking effect characteristic quantity can in particular correspond to the braking effect characteristic quantity B1.

If it is identified by means of the second braking effect monitoring unit 52 that the braking effect which is generated or can be achieved by the electrodymamic brake 24 is insufficient, the braking control unit 30 is considered to be faulty and, as a fallback measure, the further braking apparatus 17 is actuated by means of a switching device 54 controlled by the second braking effect monitoring unit 52.

The braking control units 28, 30 are based on different technologies. A technology includes the structural, or hardware-based, and/or the algorithmic, or software-based design. In an exemplary configuration, the first braking control unit 28 can be in the form of a signal processor (also referred to as "SIP"), wherein the algorthimic implementation can correspond to field-oriented control. The second braking control unit 30 can be in the form of a field programmable gate array FPGA), wherein the algorithmic implementation can correspond to switching-oriented control.

In accordance with an alternative embodiment, the second braking control unit 30 is designed in such a way that the activation of the power supply unit 20 takes place exclusively by a functionality realized by means of hardware, without the use of software, while the first braking control unit 28 is based on a hardware-based and software-based implementation of the control functions.

If the two braking control units 28, 30 are based on a software-based implementation in respect of at least one control function, the corresponding software is implemented differently in the braking control units 28, 30. In this case, in particular, the programming codes provided for executing the control function differ in that the codes are established by different people and/or different tools, for example.

By virtue of the different embodiments of the braking control units 28, 30, the switching elements of the inverter of the power supply unit 20 are controlled by the first braking control unit 28 in accordance with a first switching strategy and by the second braking control unit 30 in accordance with a second switching strategy, which is different than the first switching strategy.

In order that the switchover from one braking control unit to the other takes place reliably, the switching unit 32 assigned to the drive unit 16 is tested for its functionality at regular and sufficiently short time intervals. For example, when the rail vehicle 10 is at a standstill, for example during upgrading or performance of a brake test, the activation of the switching elements of the inverter is generated in accordance with a certain test pattern by one of the braking control units 28, 30. At least one sensor unit is provided for this purpose, which sensor unit has, for example, a phase current transformer and/or a DC link voltage transformer and which detects an effect of the activation. Once the test with the first braking control unit 28 has been performed, the second braking control unit is switched into its active state by means of the switching unit 32 and the test is repeated, preferably with a different test pattern. If an expected shift in the respective test pattern is identified, the switching unit 32 is considered to be fault-free.

Figure 3:
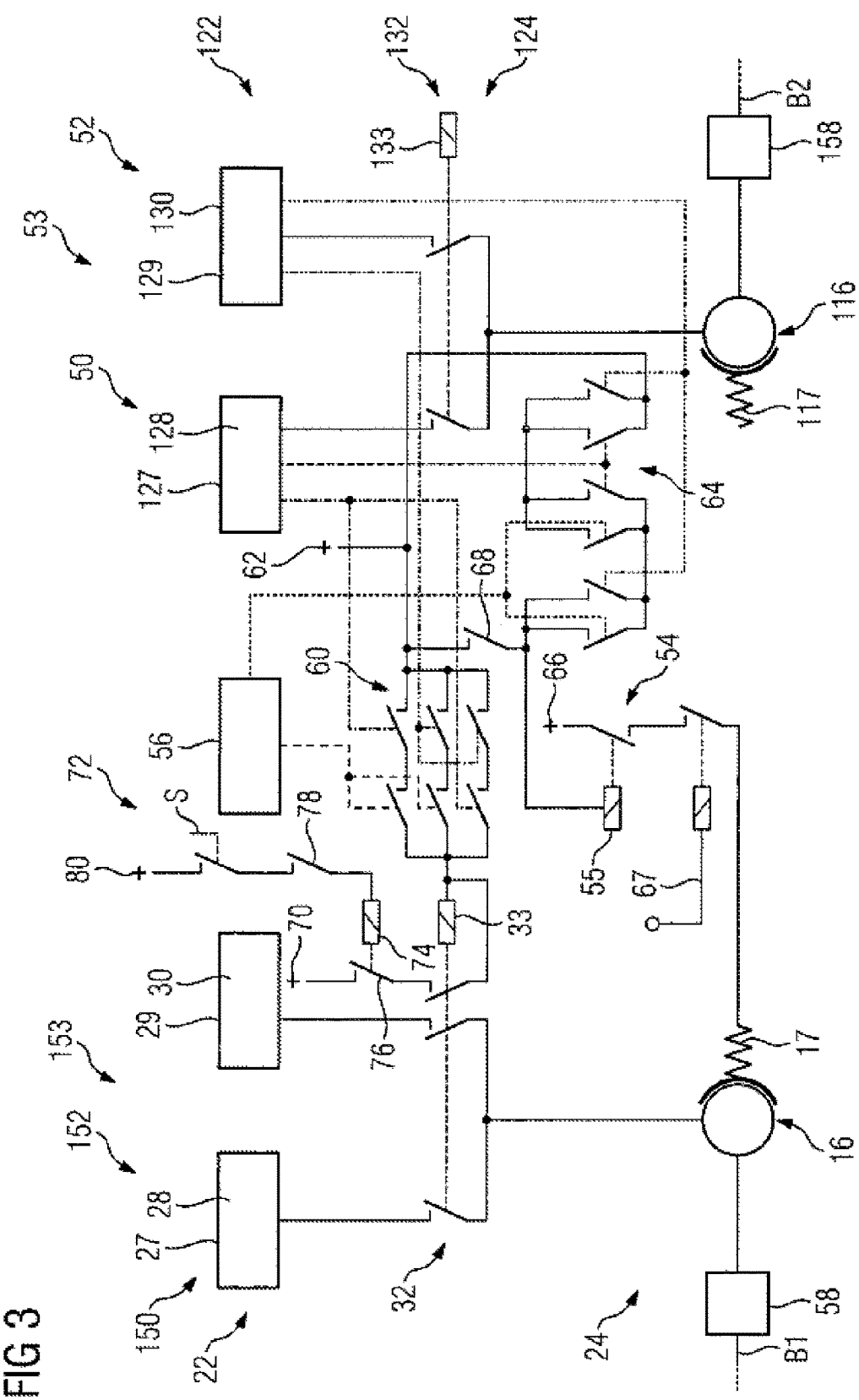
FIG. 3 shows the control circuit shown in FIG. 2 and a further control circuit, which is equipped with a monitoring function.

The above description is also applicable in relation to the drive unit 116, which is part of a second electrodynamic brake 124 of the rail vehicle 10. The power supply unit of the drive unit 116 forms, with the braking control units 128, 130, a braking regulation unit 122, as illustrated in FIG. 3. The braking regulation units 22, 122 of the rail vehicle 10, in each case with their braking control units and their power supply unit, are designed such that, in interaction, they can effect emergency braking by means of the drive motors 18 assigned thereto on the drive axles 14 of the rail vehicle 10. In other words, the braking regulation units 22, 122 are designed to generate, in interaction, a braking torque which is required for implementing emergency braking at least at the drive axles 14.

Exemplary implementation of the braking monitoring apparatus 53 with its braking effect monitoring units 50, 52 will now be described with reference to FIG. 3.

Figure 2:
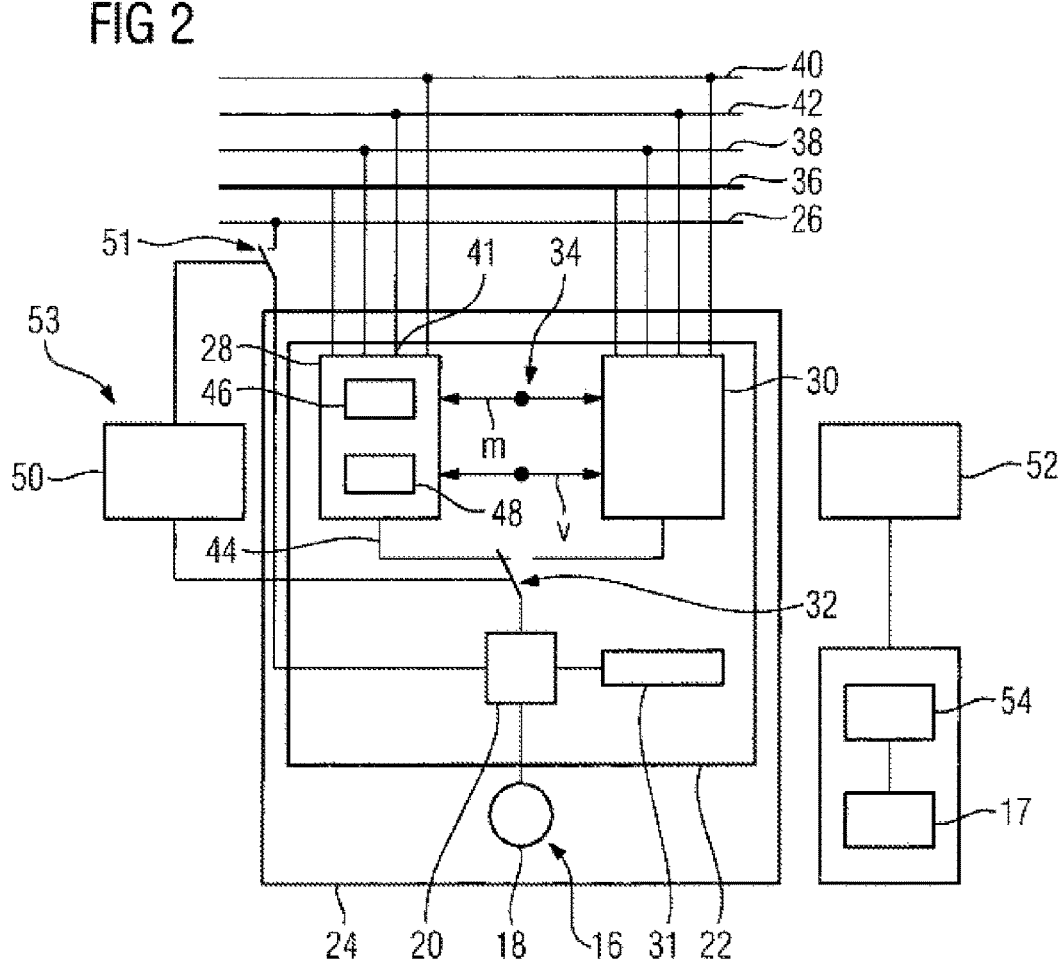
FIG. 2 shows a control circuit for controlling a drive unit in a braking mode, comprising two different braking control units.

FIG. 3 shows, on the left-hand side, the drive unit 16, which comprises, as described above, at least the drive motor 18 and the power supply unit 20 (see FIG. 2). In addition, the braking control units 28, 30, which together with the power supply unit 20 form the braking regulation unit 22, are represented. The braking regulation unit 22 forms, together with the drive motor 18, the electrodynamic brake 24, which will be referred to below as "first electrodynamic brake 24". The braking regulation unit 22 has the switching unit 32, which is provided for implementing a fallback measure of the first brake 24 in order to switch over between the first braking mode of the braking regulation unit 22, in which the first braking control unit controls the power supply unit 20 so as to provide a braking effect, and a second braking mode of the braking regulation unit 22, in which the second braking control unit 30 controls power supply unit 20 so as to provide a braking effect. FIG. 3 illustrates an actuator 33 for actuating the switching unit 32.

The rail vehicle 10 has, as also illustrated in FIG. 1, the further drive unit 116. The drive unit 116, which, in the same way as the drive unit 16, comprises at least one drive motor and a power supply unit, is part of an electrodynamic brake 124, which is largely, in particular completely identical to the electrodynamic brake 24. Reference is therefore made to the description above relating to the electrodynamic brake 24 so as to avoid unnecessary repetition.

The electrodynamic brake 124, which is referred to below as "second electrodynamic brake 124", has the drive motor of the drive unit 116 and a braking regulation unit 122. Said braking regulation unit comprises the power supply unit of the drive unit 116 and two braking control units 128, 130, which are each provided for controlling, in an active state, this power supply unit for a braking operation of the electrodynamic brake 124. The braking regulation unit 122 has a switching unit 132 comprising actuator 133, which switching unit has the same function as the switching unit 32 in the first electrodynamic brake 24; it is provided for switching over between the first braking mode of the braking regulation unit 122, in which the first braking control unit 128 controls the power supply unit of the drive unit 116 so as to provide a braking effect, and a second braking mode of the braking regulation unit 122, in which the second braking control unit 130 controls this power supply unit so as to provide a braking effect, in order to implement the respective fallback measure.

In addition, the mechanical braking apparatus 17, which is assigned to the first electrodynamic brake 24, and the further mechanical braking apparatus 117, which is assigned to the second electrodynamic brake 124, are illustrated.

The monitoring of the first electrodynamic brake 24 described above with reference to FIG. 2 takes place in the exemplary embodiment under consideration at least by means of the braking regulation unit 122 of the second electrodynamic brake 124. Hereby, the braking monitoring device 53 assigned to the first brake 24 is formed at least by the braking regulation unit 122 of the second brake 124.

The braking monitoring device 53 illustrated in FIG. 2 is formed by the braking control units 128, 130 of the braking regulation unit 122 of the second brake 124 and by a further monitoring unit 56 separate therefrom.

The braking monitoring apparatus 53 is provided, in particular programmed, with a first monitoring function, in which this braking monitoring apparatus 53, in addition to the above-described control tasks of the braking control units 128, 130 for controlling the power supply unit of the drive unit 116, is in the form of a first braking effect monitoring unit 50, which is provided for monitoring the first brake 24 in the first braking mode thereof.

This monitoring function is based on a monitoring task described below which is performed by each of the braking control units 128, 130 and the monitoring unit 56 in parallel and largely, in particular completely, independently. These units are each operatively connected to a sensor unit 58, which is provided for detecting or determining a first braking effect characteristic quantity B1 for the first braking mode of the first electrodynamic brake 24.

The braking effect characteristic quantity B1 can be in particular a braking torque characteristic quantity, wherein the sensor unit 58 can be mechanically coupled, for example, to an axle 14 drivable by the drive motor 18 and can be in the form of a torque sensor, for example. The sensor unit 58 is illustrated schematically and can comprise one or more sensors, wherein the sensor unit 58 provides the braking effect characteristic quantity B1 from one or more measured variables.

In a further embodiment, a plurality of braking effect characteristic quantities can be detected by the sensor unit 58, which braking effect characteristic quantities differ from one another in terms of their type and are each evaluated by a different unit of the braking monitoring apparatus 53, as described in more detail below.

As already described above, the braking control units 28, 30 of the first brake 24 are based on different technologies. This applies correspondingly for the braking control units 128, 130. A technology is interpreted as the structural, or hardware-based, and/or the algorithmic, or software-based, design. In an exemplary configuration, the first braking control unit 128 can be in the form of a signal processor (also referred to as "SIP"), wherein the algorithmic implementation corresponds to field-oriented control. The second braking control unit 130 can be in the form of a field programmable gate array (FPGA), wherein the algorithmic implementation corresponds to switching-oriented control.

In accordance with an alternative embodiment, the second braking control unit 130 is embodied in such a way that the activation of the power supply unit of the drive unit 116 takes place exclusively by a functionality implemented by means of hardware, without the use of software, while the first braking control unit 128 is based on a hardware-based and software-based implementation of the control functions.

If the two braking control units 128, 130 are based on a software-base implementation in respect of at least one control function, the corresponding software is implemented differently in the braking control units 128, 130. In this case, in particular the programming codes provided for executing the control function differ by virtue of the codes being established by different people and/or different tools, for example.

Owing to these differences, which apply to the control function of the braking control units in the respective braking mode, each of the braking control units 128, 130 can monitor the braking effect of the first brake 24 in the first braking mode thereof in each case in accordance with an individual method, which differs from the method of the other braking control unit. The braking control units 128, 130 of the braking regulation unit 122 of the second brake 124 accordingly correspond in terms of the implementation of monitoring functions to two monitoring devices 127, 129 of the braking monitoring apparatus 53, which two monitoring devices differ from one another in terms of the above-described features. In particular, they differ from one another with respect to their structural and/or algorithmic design. If they each have software for executing monitoring functions, this software is implemented differently.

The monitoring unit 56 is based on a technology which differs from the technologies of the braking control units 128, 130 or the monitoring devices 127, 129. For example, the monitoring unit 56 can be based on CPLD ("Complex Programmable Logic Device") technology. The monitoring of the braking effect generated by the first brake 24 can accordingly take place in accordance with a method which differs from the methods of the braking control units 128, 130 or monitoring devices 127, 129.

The monitoring task to be performed by each braking control unit 128, 130 and by the monitoring unit 56 consists in determining, on the basis of the braking effect characteristic quantity B1, whether the braking effect generated by the first brake 24 in the first braking mode thereof is sufficient. Owing to the different technologies, in the exemplary embodiment under consideration the monitoring mechanism with which the braking control units 128, 130 and the monitoring unit 56 are equipped for implementing the first monitoring function is realized in each case in a different way and is different for each of these units. In particular, the different monitoring mechanisms can be realized by different monitoring software. The monitoring task is therefore performed largely separately, in particularly completely separately, in each case by means of a different method, i.e. by means of a different implementation of the task by these units.

As already mentioned above, in a particular embodiment a plurality of braking effect characteristic quantities can be detected by the senior unit 58, which braking effect characteristic quantities differ from one another in terms of their type and are each evaluated by a different unit of the braking monitoring apparatus 53. The type of braking effect characteristic quantities is in this case determined by the technology of the respective unit of the braking monitoring apparatus 53.

The braking control units 128, 130 of the second brake 124, i.e. the monitoring devices 127, 129 and the monitoring unit 56, are each provided for outputting an error signal during performance of this monitoring task depending on the first braking effect characteristic quantity B1 or on the respective braking effect characteristic quantity. This error signal is output by each of these units if the evaluation of the braking effect characteristic quantity B1 or of the respective braking effect characteristic quantity by the respective unit has the result that an insufficient braking effect of the first brake 24 in the first braking mode thereof is considered to be identified. Owing to the different implementation of the monitoring task in each of the mentioned units, a largely independent, in particular completely independent output of an error signal by the units of the braking monitoring apparatus 53 can take place.

The actuation of the switching unit 32 as described above only takes place when at least two error signals are output. For this purpose, a trigger unit 60 is used which, as part of the first braking monitoring apparatus 53, is operatively connected to an output of the braking control units 128, 130 (or monitoring units 127, 129) and the monitoring unit 56, on one side, and to the switching unit 32, in particular to the actuator 33, on the other side. The trigger unit 60 (also referred to as "Voter" device) has three lines connected in parallel with one another, which lines are electrically connectable to a common voltage source 62 and jointly to the actuator 33. In each case two switches are arranged in each line, wherein the switches are in an open position during performance of the monitoring task by the braking control units 128, 130 and the monitoring unit 56, and therefore in the first braking mode of the first brake 24. As a result, an electrical connection between the voltage source 62 and the actuator 33 is disconnected. This electrical connection can be produced by closing both switches in at least one line, as a result of which the switching unit 32 is actuated. The switches are each closed by means of an error signal, which is present at the output of a unit of the braking monitoring apparatus 53. In each line, the switches are each operatively connected to a different unit, with the result that closing of both switches in this line and therefore the actuation of the switching unit 32 only take place when an error signal is output by two different units of the braking monitoring apparatus 53.

The monitoring task, namely the individual evaluation of the braking effect characteristic quantity B1 or of the respective braking effect characteristic quantity by the braking control units 128, 130 and the monitoring unit 56 is performed by these units largely independently of one another, as described above. The monitoring function comprises this monitoring task and is performed by the actuation of the switching unit 32 by an interaction of the units of the braking monitoring apparatus 53, i.e. the monitoring devices 127, 129 and the monitoring unit 56, in particular by a combination of the results of the individual monitoring tasks.

With the actuation of the switching unit 32, when there is an insufficient braking effect of the first electrodynamic brake 24 in the first braking mode thereof, a fallback measure is initiated, which corresponds to the second braking control unit 30 taking on the control of the power supply unit 20 as described further above.

The braking monitoring apparatus 53 is provided, in particular programmed, with a second monitoring function, in which it is in the form of a second braking effect monitoring unit 52, in addition to the above-described control tasks of the braking control units 128, 130 for controlling the power supply unit of the drive unit 116 (see FIG. 2), which second braking effect monitoring unit 52 is provided for monitoring the first brake 24 in the second braking mode thereof.

This second monitoring function is based on a monitoring task which is performed largely separately by each of the braking control units 128, 130 and the monitoring unit 56 and is identical to the monitoring task of the first monitoring function. The second monitoring function differs from the first monitoring function by way of the use of a further trigger unit 64, which, as part of the braking monitoring apparatus 53, is operatively connected to an output of the braking control units 128, 130 or the monitoring unit 56, on one side, and to the switching device (see also FIG. 2), in particular to the actuator 55 thereof. The trigger unit 64 (also referred to as the "Voter" device) has three series-connected pairs of parallel lines, which are electrically connectable to the common voltage source 62 and jointly to the actuator 55. For each pair of lines, in each case one switch is arranged in both lines, wherein the switches are in a closed position during the performance of the monitoring task by the braking control units 128, 130 and the monitoring unit 56, and therefore during the second braking mode of the first brake 24. As a result, an electrical connection is produced between the voltage source 62 and the actuator 55. This electrical connection can be interrupted by opening both switches in at least one line pair, as a result of which the switching unit 54 is actuated.

The switches are each opened by means of an error signal, which is present at the output of a unit of the braking monitoring apparatus 53. In each line pair, the switches are in each case operatively connected to a different unit, with the result that opening of both switches in this line pair and therefore the actuation of switching device 54 only take place when an error signal is output by two different units of the braking monitoring apparatus 53.

During the second braking mode of the first brake 24, the switching unit 54 is in a closed position, as a result of which an electrical connection between a voltage source 66 and the braking apparatus 17 is produced. In this case a signal "release of the braking apparatus 17" is set. If the switching unit 54 is actuated, this electrical connection is disconnected, as a result of which a signal "application of the braking apparatus 17" is generated. The figure also shows a control line 67, by means of which the braking apparatus 17 can be actuated at any time by means of a command by the vehicle driver.

The monitoring task, namely the individual evaluation of the braking effect characteristic quantity B1 or the respective braking effect characteristic quantity by the braking control units 128, 130 and by the monitoring unit 56 is performed by these units largely independently of one another, as described above. The monitoring function comprises this monitoring task and is performed by the actuation of the switching unit 54 by interaction of these units, in particular by a combination of the results of the individual monitoring tasks.

With the actuation of the switching device 54, when the braking effect of the first electrodynamic brake 24 in the second braking mode thereof is insufficient a fallback measure is initiated, which corresponds to the actuation of the mechanical brake 17 described further above. The second braking mode should continue to take effect until the braking operation is at an end.

During implementation of the first braking mode, in which the first monitoring function can be performed by means of the trigger unit 60, the trigger unit 64 provided for the second monitoring function is inactive by virtue of a permanent electrical connection, which is independent of the configuration of the trigger unit 64, being produced between the voltage source 62 and the actuator 55. This electrical connection is interrupted by a switch 68 on transfer to the second braking mode, which switch is opened during actuation of the switching unit 32 by the actuator 33. The electrical connection then only remains via the trigger unit 64, which is therefore set to an active state. During the implementation of the second braking mode, in which the second monitoring function can be performed by means of the trigger unit 64, the trigger unit 60 provided for the first monitoring function is inactive by virtue of a permanent electrical connection, which is independent of the configuration of the trigger unit 60, being produced between a voltage source 70 and the actuator 33. In addition, a resetting unit 72 is provided for the switching unit 32, which resetting unit is used for bringing the first braking control unit 28 back into operation after the end of the second braking mode or after completion of a braking operation by means of the braking apparatus 17. This takes place by means of a signal S, which actuates an actuator 74, by means of which a switch 76 disconnects the electrical connection of the actuator 33 to the voltage source 70. With this disconnection, activation of the actuator 33 takes place, which actuator performs the following switching operations: the switching unit 32 is reset, with the result that the braking control unit 28 is again operatively connected to the power supply unit 20; the switch 68 is actuated, with the result that an electrical connection between the voltage source 62 and the actuator 55 is produced, and as a result, the trigger unit 64 is deactivated; a switch 78 disconnects an electrical connection between a voltage source 80 and the actuator 74, with the result that the resetting unit 72 is deactivated or no actuation of the switch 76 by the actuator 74 by means of the signal S can take place. Actuation of the switch 78 for activating the resetting unit 72 presupposes an end of the state which has resulted in response of the monitoring.

The first and second monitoring functions which are performed by the braking monitoring apparatus 53 belong to a first monitoring mode of the braking device of the rail vehicle 10, in which the first brake 24 is monitored. In this case, a monitoring role for initiating one of the above-described fallback measures relating to the first brake 24 is assumed by the second brake 124, in particular by the braking regulation unit 122 thereof. The braking device of the rail vehicle 10 is provided with a second monitoring mode, in which the second brake 124 is monitored. In the exemplary embodiment under consideration, a monitoring role for initiating one of the above-described fallback measures relating to the second brake 124 is assumed by the first brake 24, in particular by the braking regulation unit 22 thereof. The braking regulation unit 22 of the first brake 24 forms, together with the monitoring unit 56, a second braking monitoring apparatus 153, which is provided for taking into consideration a braking effect characteristic quantity B2 for initiating a fallback measure relating to the second brake 124. The braking monitoring device 153 is provided with two monitoring functions, in the same way as the braking monitoring apparatus 53, which two monitoring functions are each provided for monitoring the second brake 124 during implementation of the first braking mode or second braking mode thereof. The braking control units 28, 30, when implementing the monitoring functions, are in the form of monitoring devices 27, 29 of the braking monitoring apparatus 153. During the implementation of the first monitoring function and the second monitoring function, the braking monitoring apparatus 153 is in the form of a braking effect monitoring unit 150 or 152 for the first or second braking mode of the braking regulation unit 122 of the second brake 124. This monitoring takes place depending on a second braking effect characteristic quantity B2 or on a plurality of braking effect characteristic quantities which are different from one another in terms of their type, which braking effect characteristic quantity or quantities is or are detected by a sensor unit 158. The above description relating to the sensor unit 58 applies correspondingly to the sensor unit 158.

In a particular embodiment, the sensor units 58 and 158 can be formed at least partially by an identical sensor structure, with respect to hardware. For reasons of clarity, FIG. 3 only illustrates the monitoring of the first brake 24 by the second brake 124. The above description of the monitoring functions performed by the braking monitoring apparatus 53 can be used correspondingly for the first brake 24 with respect to the monitoring of the second brake 124. In this case, the corresponding monitoring functions are performed by the braking control units 28, 30 in their function as monitoring devices 27, 29 in interaction with the monitoring unit 56.

In the exemplary embodiment under consideration, the monitoring unit 56 is a common part of the first braking monitoring apparatus 53 and the second braking monitoring apparatus 153.

The implementation of the monitoring functions can take place in the braking control units 28, 30, 128, 130 in their functions as monitoring devices 27, 29, 127, 129 in each case by means of an arithmetic logic unit, which has an identical design to or different design from the arithmetic logic unit which is provided for implementing a braking mode.

Emergency braking by means of the electrodynamic brakes 24, 124 can be triggered by the interface to the vehicle emergency braking line 42. With the safety level which can be achieved by the proposed design of the rail vehicle braking device, in particular given a design of the braking regulation units with at least two braking control units, a rail vehicle with an emergency braking apparatus can be provided, wherein emergency braking can take place exclusively by means of the electrodynamic brakes with a sufficient safety level. As a result, it is advantageously possible to dispense with a full-service, additional friction brake. For lower velocities, only a parking brake, for example in the form of a spring-loaded brake, which prevents the parked vehicle on a slope from rolling away as a result of a frictional force generated by means of a spring energy store, can be maintained as friction brake. Thus, a considerable reduction in the costs of braking components and the weight of the rail vehicle can be achieved.

In the embodiment shown in FIG. 3, the drive units 16 and 116 can be assigned to an identical truck of the rail vehicle 10 or separate trucks. In the embodiment shown in FIG. 1, the drive units 16, 116 are each assigned to a different truck. In this case, the drive axles 14 of an identical truck are each driven by a dedicated drive motor, wherein both drive motors are supplied power by the same power supply unit. In the case of the braking device shown in FIG. 3, in this embodiment the electrodynamic brakes 24, 124 are then in each case assigned to different trucks and therefore a plurality of drive axles. Accordingly, truck-wise localization of a braking effect loss can be achieved by the braking monitoring apparatuses 53, 153 and a fallback measure in relation to the respective truck can be initiated in differentiated fashion.

In an alternative embodiment, a drive motor is provided for each driven axle of a truck, wherein in each case one different power supply unit is provided for each drive motor of this truck. In this embodiment, accordingly in each case a separate electrodynamic brake is assigned to each driven axle of the truck. In the case of the braking device shown in FIG. 3, in this embodiment the electrodynamic brakes 24, 124 are then assigned to an identical truck or in each case to a different drive axle in this truck. Accordingly, axle-wise localization of a braking effect loss can be achieved by the braking monitoring apparatuses 53, 153 and a fallback measure in relation to the respective drive axle can be initiated in differentiated fashion.

The invention claimed is:

1. A rail vehicle braking device, comprising:
    a first electrodynamic brake having:
        a first drive unit with at least one first drive motor and a first power supply unit for supplying power to said at least one first drive motor in a traction mode of said first drive unit, and having at least two braking control units including a first braking control unit and a second braking control unit, wherein, in a first braking mode, said first braking control unit, in an active state, controls said first power supply unit such that said first drive unit causes said first electrodynamic brake to provide a braking effect, wherein the braking effect is a braking effect achieved by means of the first electrodynamic brake or a braking effect which can be achieved by operation of a braking control unit,
        a first braking effect monitoring unit and a switching unit configured for, depending on a braking effect in the first braking mode, switching over to a second braking mode, in which said second braking control unit, in an active state, controls said first power supply unit such that said first drive unit causes said first electrodynamic brake to provide a braking effect; and
        a first braking closed-loop unit including said first power supply unit and at least said first braking control unit and said second braking control unit; and
    a second electrodynamic brake having:
        a second drive unit with at least one second drive motor and a second power supply unit for supplying power to said second drive motor of said second electrodynamic brake in the traction mode of said second drive unit, and having at least two braking control units including a third braking control unit and a fourth braking control unit, wherein, in the first braking mode, said third braking control unit controls said second power supply unit such that said second drive unit causes said second electrodynamic brake to provide a braking effect, and
        a second braking closed-loop unit including said second power supply unit and at least said third braking control unit and said fourth braking control unit;
    wherein said at least one first braking closed loop unit of said first electrodynamic brake forms a first braking monitoring apparatus assigned to said second electrodynamic brake; and
        wherein said at least one second braking closed-loop unit of said second electrodynamic brake forms a second braking monitoring apparatus assigned to said first electrodynamic brake.

2. The rail vehicle braking device according to claim 1, wherein said first braking control unit is inactive in the second braking mode.

3. The rail vehicle braking device according to claim 1, wherein the first braking effect monitoring unit is used for monitoring the first braking control unit, and in that at least one second braking effect monitoring unit is provided for monitoring at least the second braking control unit.

4. The rail vehicle braking device according to claim 3, comprising a further braking apparatus and a further switching device, wherein, in the second braking mode, said further braking apparatus is actuated by said further switching device depending on a braking effect characteristic quantity detected in the second braking mode.

5. The rail vehicle braking device according to claim 4, wherein said braking apparatus is a parking brake.

6. The rail vehicle braking device according to claim 1, wherein said at least two braking control units of said first drive unit differ from one another with respect to a structural and/or algorithmic design thereof.

7. The rail vehicle braking device according to claim 6, wherein software for executing at least one control function is implemented differently in said second braking control unit than in said first braking control unit.

8. The rail vehicle braking device according to claim 6, wherein one of said at least two braking control units of said first drive unit is in the form of a purely hardware-based control.

9. The rail vehicle braking device according to claim 1, which comprises a test mode, in which said switching unit is tested.

10. The rail vehicle braking device according to claim 1, comprising an interface to a vehicle emergency brake line for enabling emergency braking by way of said first electrodynamic brake to be initiated.

11. A method of braking a rail vehicle, the method comprising:
    providing a first electrodynamic brake having a first drive unit with at least one first drive motor and a first power supply unit for supplying power to the at least one first drive motor in a traction mode of the first drive unit, and having at least two braking control units including a first braking control unit and a second braking control unit;
    in a first braking mode, controlling the first power supply unit with the first braking control unit, in an active state, such that the first drive unit causes the first electrodynamic brake to provide a braking effect, wherein the braking effect is a braking effect achieved by means of the first electrodynamic brake or a braking effect which can be achieved by operation of a braking control unit;
    providing the first electrodynamic brake with a first braking effect monitoring unit and a switching unit;
    with the switching unit, depending on a braking effect in the first braking mode, switching over to a second braking mode, in which the second braking control unit, in an active state, controls the first power supply unit such that the first drive unit causes the first electrodynamic brake to provide a braking effect;
    providing the first electrodynamic brake with a first braking closed-loop unit including the first power supply unit and at least the first braking control unit and the second braking control unit;

providing a second electrodynamic brake having a second drive unit with at least one second drive motor and a second power supply unit for supplying power to the second drive motor of the second electrodynamic brake in the traction mode of the second drive unit, and having at least two braking control units including a third braking control unit and a fourth braking control unit;

in the first braking mode, controlling the second power supply unit with the third braking control unit such that the second drive unit causes the second electrodynamic brake to provide a braking effect; and providing the second electrodynamic brake with a second braking closed-loop unit including the second power supply unit and at least the third braking control unit and the fourth braking control unit;

wherein the at least one first braking closed loop unit of the first electrodynamic brake forms a first braking monitoring apparatus assigned to the second electrodynamic brake; and wherein the at least one second braking closed-loop unit of the second electrodynamic brake forms a second braking monitoring apparatus assigned to the first electrodynamic brake.

12. The method according to claim 11, which comprises:

detecting a braking effect characteristic quantity in the second braking mode; and in the second braking mode, actuating a further braking apparatus by way of a switching apparatus depending on the braking effect characteristic quantity.

\* \* \* \* \*